United States Patent Office 3,046,725
Patented July 31, 1962

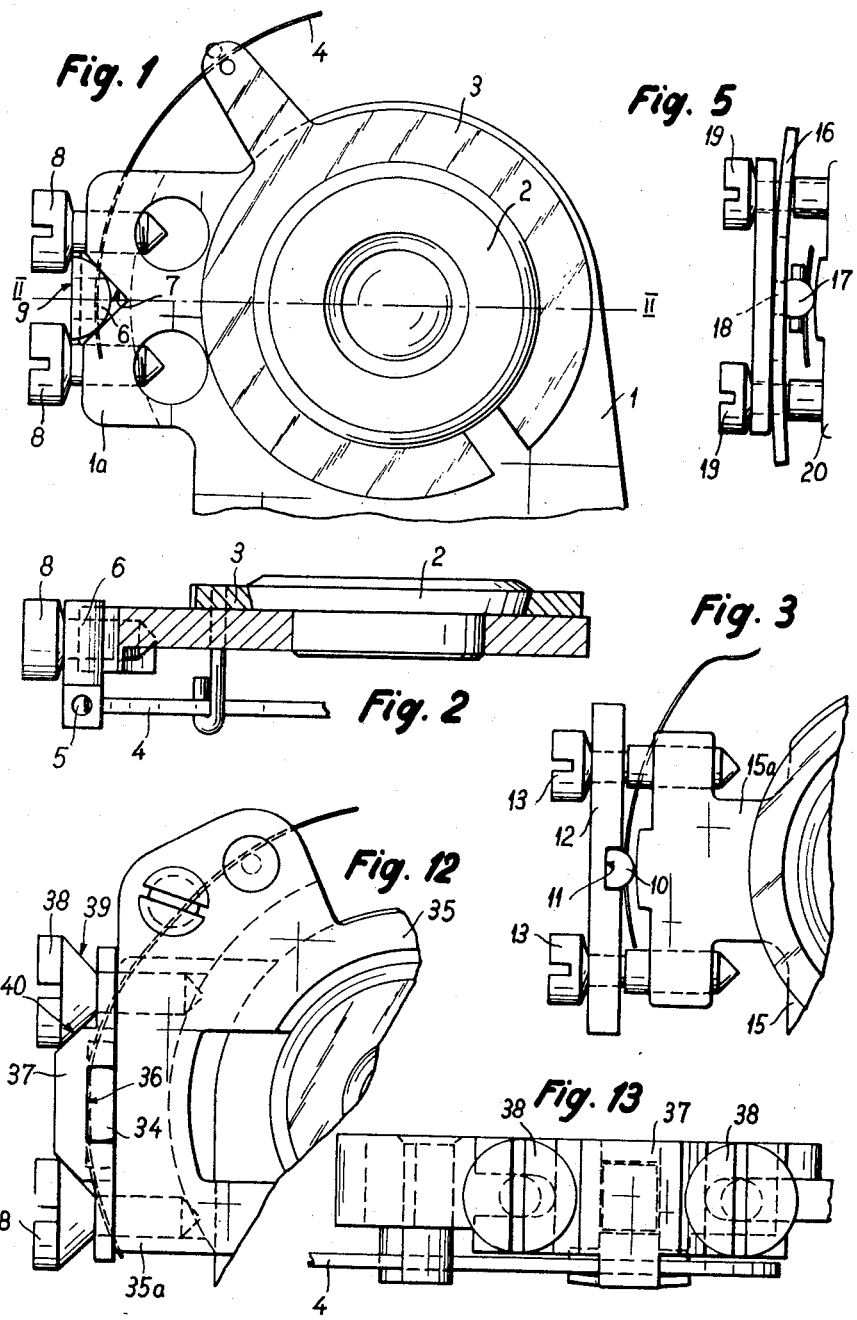

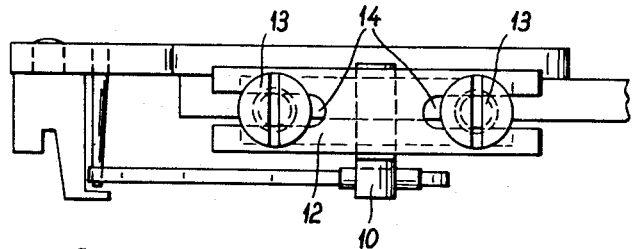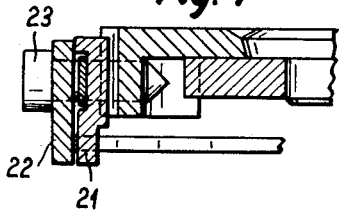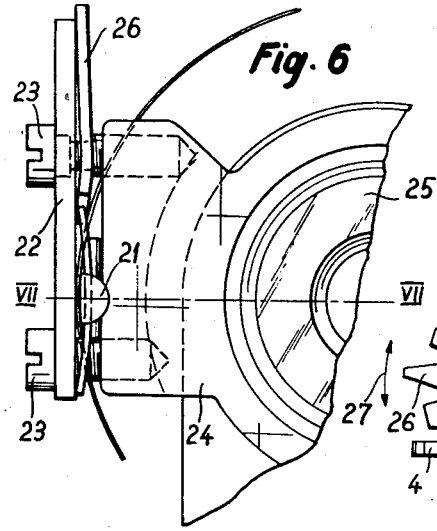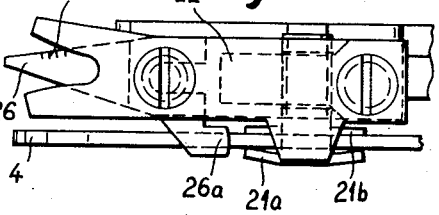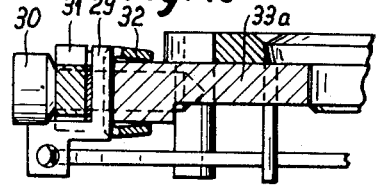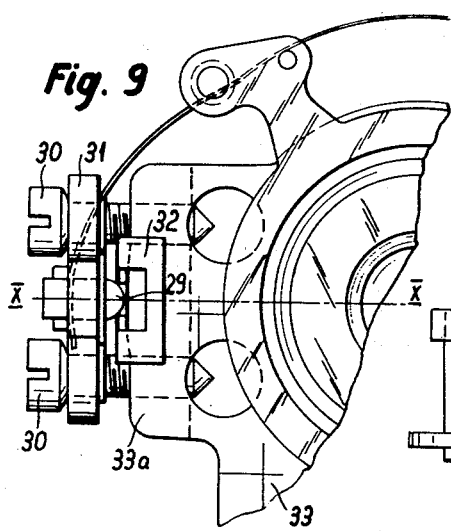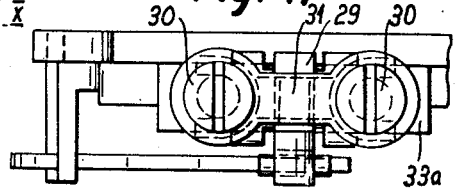

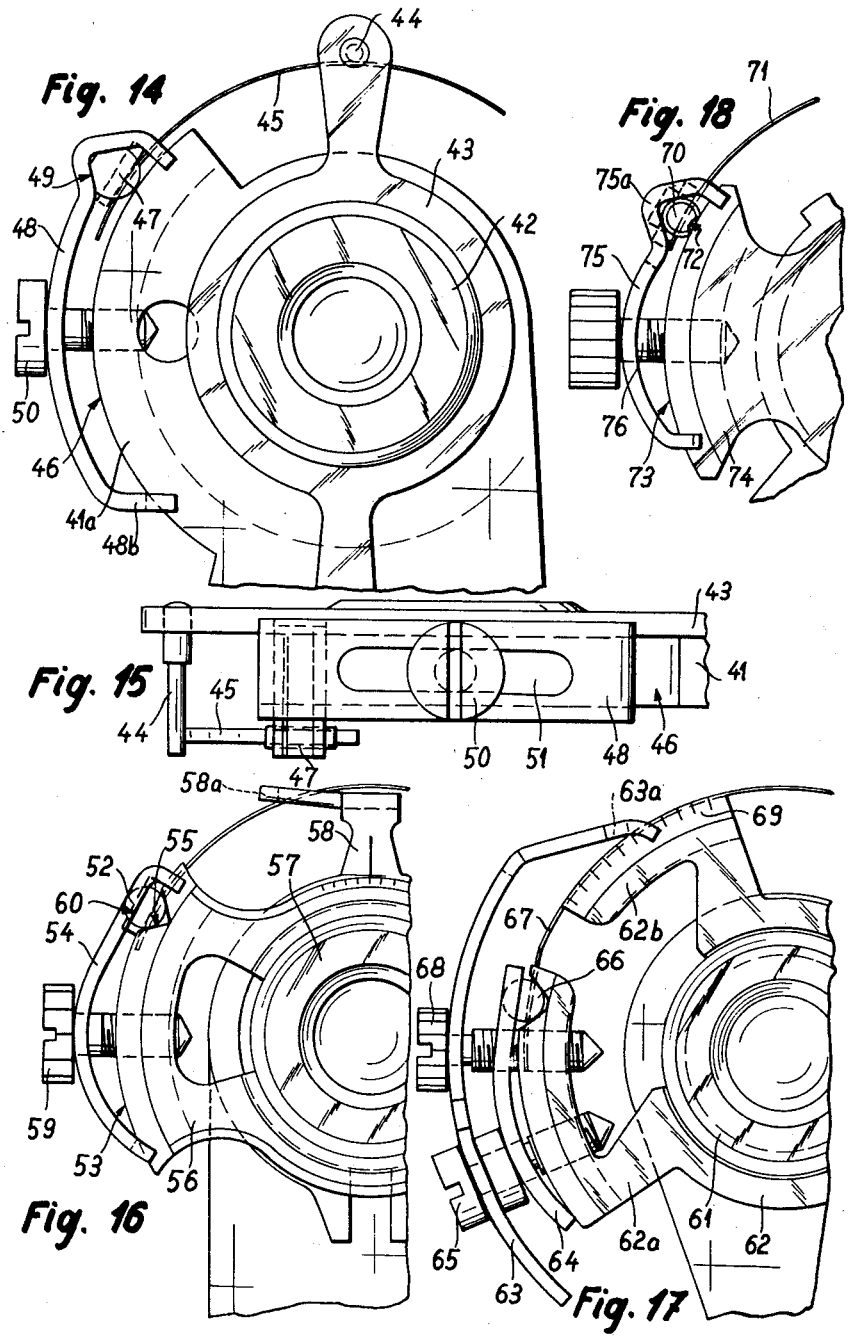

3,046,725
HAIRSPRING ADJUSTMENT DEVICE
FOR A TIMEPIECE
Marcel Vuilleumier, Baugy, Clarens, Switzerland, assignor to Parechoc S.A., Canton of Vaud, Switzerland, a firm of Switzerland
Filed Oct. 27, 1959, Ser. No. 848,965
Claims priority, application Switzerland Oct. 29, 1958
3 Claims. (Cl. 58—115)

The present invention relates to a regulating device for a timepiece comprising a balance and balance spring.

This regulating device is characterised by the fact that the fixing stud of the outer end of the balance spring is applied radially against a lateral face of the part which supports it by means of at least one screw acting thereon, at least indirectly, and permitting its position to be changed, which also modifies the adjustment of the balance spring.

The drawing illustrates by way of example several embodiments of the subject of the invention.

FIG. 1 is a plan view of a regulating device.
FIG. 2 is a section on the line II—II of FIG. 1.
FIG. 3 is a plan view of a part of a second embodiment.
FIG. 4 is a side view thereof.
FIG. 5 is a plan view of a detail of a modification.
FIG. 6 is a plan view of a part of a third embodiment.
FIG. 7 is a section on the line VII—VII of FIG. 6.
FIG. 8 is an end view of this embodiment.
FIG. 9 is a plan view of part of a fourth embodiment.
FIG. 10 is a section on the line X—X of FIG. 9.
FIG. 11 is an end view of this fourth embodiment.
FIG. 12 is a plan view of a part of a fifth embodiment.
FIG. 13 is an end view thereof.
FIG. 14 is a plan view of a sixth embodiment of a timepiece regulating device.
FIG. 15 is an end view thereof and FIGS. 16 to 18 are plan views of three other embodiments of timepiece regulating devices.

The regulating device shown in FIGS. 1 and 2 comprises a blance cock 1, an end-stone cap 2 and an index regulator 3. The outer end of the balance spring 4 is fixed by means of a key 5 in the usual way to a stud 6. The latter, which is of semi-circular cross-section over a part of its height, is held in a V-shaped groove 7 formed in the face of a lug 1a of the cock. For this purpose, two screws 8 engaging in the said lug act on a flat portion 9 of the stud. By one or other of the screws 8 being tightened to a greater or lesser degree, the stud is caused to turn on itself, this changing the position of the balance spring 4 and consequently its adjustment.

In the embodiment shown in FIGS. 3 and 4, the stud indicated at 10 is partially enclosed in a notch 11 of a bridge 12 through which extend the regulating screws indicated at 13. The openings 14 of the bridge 12 through which the screws 13 pass are elongated, so that this bridge can be displaced laterally along the face of the lug 15a of the cock 15. Owing to this arrangement, the initial position of the stud 10 from which this latter can be regulated by means of the screws 13 is itself adjustable.

In the modification shown in FIG. 5, the bridge 16 which acts on the stud 17 is not regid, as with the bridge 12 of the preceding embodiment, but is slightly resilient. It has a rectangular opening 18 into which the stud of circular cross-section partially extends laterally. By screwing the screws 19 to a greater or lesser extent, it is thus possible to cause turning of the stud which is wedged in the opening 18, and which is applied to the face of its support indicated at 20.

In the embodiment shown in FIGS. 6 to 8, the balance spring 4 is not fixed to the stud by a key or pin, as is the case in the preceding embodiments, but is gripped between the stud indicated at 21 and the fixing bridge 22 of the latter. Screws 23 permit its angular position to be modified relatively to its support. The latter is formed by a stud carrier 24 mounted to rotate about the end-stone cap indicated at 25. A plate 26, which is slightly curved in order to be held in position by friction, is fitted over one of the screws 23.

This plate has a tongue 26a co-operating with the balance spring 4 in the manner of a regulator stop. By displacing the plate 26 in the direction of the arrow 27, the position of the tongue 26a on the spiral is modified, and this permits a fine adjustment of the running of the watch. A scale 28 carried by the plate 26 enables the displacements of the latter to be controlled.

It is to be pointed out that the stud 21, which is obtained by turning, has two arms 21a and 21b between which the balance spring 4 extends. The latter is thus guided, it being possible for the arm 21a and 21b to be slightly bent when it is a matter of correcting an error in the orientation of the spring.

In the embodiment shown in FIGS. 9 to 11, the stud 29 is applied by screws 30, by means of a bridge 31, against a cross-member 32 interposed between it and the lug 33a of the clock 33. This cross-member may be displaced laterally on the lug 33a of the clock, which thus permits of modifying the initial position of adjustment of the stud.

In FIGS. 12 and 13, the stud 34 cannot be turned on itself, as in the previous embodiments, but can slide along the face of the lug 35a of the stud holder 35. It is engaged in a groove 36 of a plate 37 on which two screws 38 are adapted to operate. Due to the frusto-conical portions 39 of these screws co-operating with two inclined surfaces 40 of the plate 37, the position of the latter can be very accurately regulated.

According to whether the regulating device according to the present invention is applied to conventional regulators provided with two regulating pins or to regulators provided with only one internal pin, according to whether the stud will turn on itself or slide on its support, or according to whether the balance spring will extend through the pivot axis of the stud or slightly outside the latter, the effects on the balance spring of the adjustment of the position of the stud will be different; the action of the screws will thus make it possible to change either the centering of the balance spring relatively to the cock, or the bearing of the balance spring against the internal stop of the regulator, or the effective length of the spring.

The regulating device shown in FIGS. 14 and 15 comprises a cock 41 carrying an end-stone cap 42 around which is rotatably mounted a regulator 43 carrying a single regulating pin 44 for the effective length of the balance spring 45.

The cock 41 has a lug 41a, the lateral face 46 of which is cylindrical. The fixing stud 47 for the end of the balance spring is held laterally against the cylindrical face 46 of the lug 41a by curved resilient blade 48, one end 48a of which is bent to V-shape so as to match the shape of the stud 47 which has two flats 49 forming a dihedral angle between them. The end 48a of the blade 48 thus bears against the surface 46 by means of the stud 47, while its other end indicated at 48b bears directly on the surface 46. An adjusting and fixing screw 50 extends through an elongated opening 51 (FIG. 15) of the blade 48 and engages in the lug 41a of the cock.

The adjustment is effected in the following manner: by displacing the blade 48 along the surface 46, which is made possible by the elongated opening 51, the balance spring is positioned at its index mark. By acting on the regulator 43, its effective length is modified, thus regulating the running of the watch. Due to the fact that the regulator only carries a single regulating stop, it must be able to act on the balance spring so as to avoid the latter becoming detached from the stop 44. To this end, the angular position of the stud 47 is altered by screwing the screw 50 to a varying degree; the blade 48 is curved to a greater or lesser extent, and thus causes the stud 47 to turn about its axis.

The embodiment according to FIG. 16 differs from the first mainly by the fact that the stud, indicated at 52, cannot be displaced along the cylindrical surface 53 against which it is held by a curved resilient blade 54, because it is partially located in a V-shaped groove 55 formed in the surface 53. The latter is formed by the lateral face of a stud support 56 mounted to rotate about the end-stone cap 57. The indexing of the spring is effected by displacing the stud support 56.

The adjustment of the effective length of the balance spring is obtained by displacing a regulator 58 mounted on the stud support 56, a bent-over portion 58a of which forms an adjustment stop. By tightening a screw 59 to a varying degree, which screw extends through the blade 54 substantially at its centre, the stud 52 is caused to turn about itself, due to the fact that the blade bears on a flat 60 on the stud.

In the embodiment shown in FIG. 17, the stud support is mounted to rotate about the end-stone cap 61 and is indicated at 62. It is formed with a lug 62a on which are fixed two resilient blades 63 and 64 by means of a screw 65. The blade 64 holds the fixing stud 66 of the balance spring 67 in a manner analogous to that which is described and illustrated in connection with the second embodiment. The blade has a projecting tongue 63a forming the regulating stop for the effective length of the balance spring. This blade 63 is under the action of an adjusting screw 68 which bends it to a greater or lesser degree, thereby causing the tongue 63a to slide along a lug 62b of the stud support opposite a scale 69, thus modifying the effective length of the spring.

By varying the amount to which the screw 65 is tightened, the angular position of the stud 66 is altered, this permitting the spring to be easily displaced without having to deform it by means of pincers, as is the case with the ordinary regulating devices.

In the modification according to FIG. 18, the fixing stud 70 of the balance spring 71 has an indentation 72, the surface of which is cylindrical, so that this stud bears on the lateral face 73 of the stud 74 by the two end edges of the said indentation. A curved resilient blade 75 has extending therethrough a screw 76 which screws into the stud support 74. One of the ends 75a of the blade 75 is bent to V-shape and grips the stud 70.

By varying the amount by which the screw 76 is tightened the curvature of the blade 75 is varied, this displacing the stud 70 along the surface 73 of the stud support 74.

What I claim is:

1. In a regulating device for a timepiece comprising a frame, a balance, a balance spring, and a cylindrical stud provided with a flat portion and carried by the said frame, to which the outer end of said balance spring is fixed, in such a regulating device: two screws screwed in the said frame, a bridge held in place by the said two screws, said bridge being provided with a notch showing a flat bottom facing the said frame, the said stud being partially engaged in the said notch, with its flat portion bearing on the flat bottom of the said notch, and being pinched between the said bridge and a lateral face of the said frame on which it bears by its cylindrical surface, whereby said screws permit to change the position of the said stud and thereby to modify the adjustment of the balance spring.

2. In a regulating device for a timepiece comprising a frame, a balance, a balance spring, and a cylindrical stud provided with a flat portion and carried by the said frame, to which the outer end of the said balance spring is fixed, in such a regulating device: a convex portion on the lateral face of the said frame, two screws screwed in the said frame, a bridge held in place by said two screws opposite the said convex portion, said bridge being provided with a notch showing a flat bottom facing the said convex portion, the said stud being partially engaged in the said notch, with its flat portion bearing on the flat bottom of the said notch, and being pinched between the said bridge and the said convex portion of the said frame on which convex portion it bears by its cylindrical surface, whereby said screws permit to change the position of the said stud and thereby to modify the adjustment of the balance spring.

3. In a regulating device for a timepiece comprising a frame, a balance, a balance spring, and a cylindrical stud provided with a flat portion and carried by the said frame, to which the outer end of said balance spring is fixed, in such a regulating device: two screws screwed in the said frame, a bridge provided with two elongated apertures in which the said two screws are engaged and which is held in place by the said two screws opposite a lateral face of the said frame, said bridge being provided with a notch showing a flat bottom facing the said lateral portion of the said frame, the said stud being partially engaged in the said notch, with its flat portion bearing on the flat bottom of the said notch, and being pinched between the said bridge and the said lateral face of the said frame on which it bears by its cylindrical surface, whereby said screws permit to change the position of the stud and thereby to modify the adjustment of the balance spring.

References Cited in the file of this patent

UNITED STATES PATENTS

| | | |
|---|---|---|
| 1,037,742 | Dudley | Sept. 3, 1912 |
| 1,202,047 | French | Oct. 24, 1916 |

FOREIGN PATENTS

| | | |
|---|---|---|
| 514,233 | Germany | Dec. 10, 1930 |
| 310,282 | Switzerland | Dec. 16, 1955 |